United States Patent [19]

Matsumoto

[11] 3,978,496
[45] Aug. 31, 1976

[54] AUTOMATIC FLASH-PHOTOGRAPHING ARRANGEMENT

[75] Inventor: Kunio Matsumoto, Ageo, Japan

[73] Assignee: Copal Company Limited, Tokyo, Japan

[22] Filed: June 11, 1975

[21] Appl. No.: 585,870

[30] Foreign Application Priority Data
June 13, 1974 Japan................................. 49-67307

[52] U.S. Cl..................................... 354/33; 354/34; 354/60 F; 354/139; 354/149
[51] Int. Cl.².......................................... G03B 7/16
[58] Field of Search ................... 354/27, 32, 33, 34, 354/35, 60 F, 126, 127, 128, 129, 139, 149, 137

[56] References Cited
UNITED STATES PATENTS

| | | |
|---|---|---|
| 3,654,843 | 4/1972 | Ueda et al. ........................... 354/33 |
| 3,667,357 | 6/1972 | Matsuda .............................. 354/33 |
| 3,690,237 | 9/1972 | Fuwa .................................. 354/137 |
| 3,699,858 | 10/1972 | Ogiso et al. .......................... 354/33 |
| 3,757,654 | 9/1973 | Mori .................................... 354/33 |
| 3,805,278 | 4/1974 | Matsuzaki et al. .................... 354/33 |

*Primary Examiner*—Russell E. Adams, Jr.
*Attorney, Agent, or Firm*—Cushman, Darby & Cushman

[57] ABSTRACT

An automatic flash-photographing arrangement whereby flash-photography is automatically carried out at a preset shutter speed when brightness of an object is lower than a pre-determined value, the arrangement comprising an automatic exposure control circuit, an electronic change-over switch means connected to said automatic exposure control circuit, and a flash illuminating circuit connected to said change-over switch means. The electronic change-over switch means comprises an adjustable RC delay circuit which can be set for the purpose of determining whether or not flash-photography has to be carried out.

5 Claims, 1 Drawing Figure

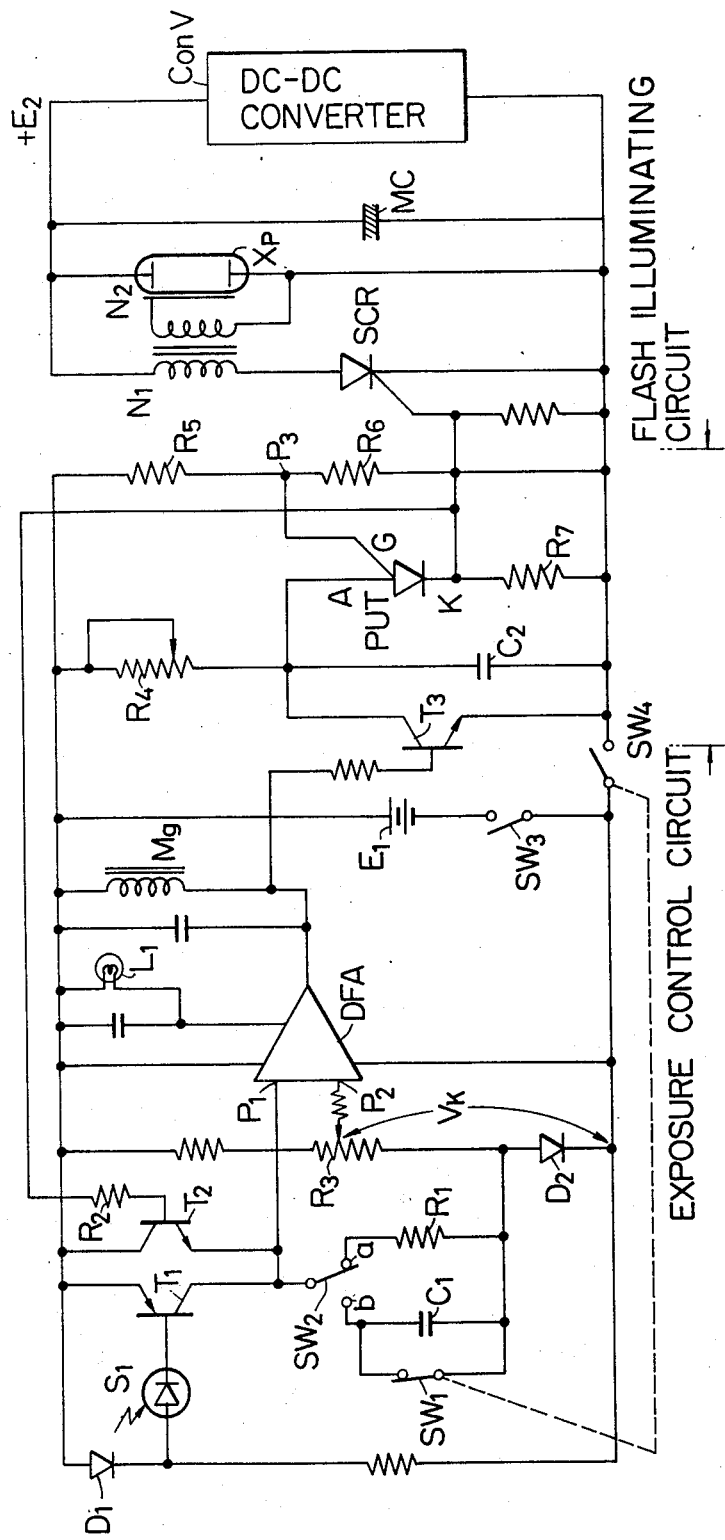

AUTOMATIC FLASH-PHOTOGRAPHING ARRANGEMENT

BACKGROUND OF THE INVENTION a. Field of the invention

The present invention relates to automatic flash-photography and, more particularly, to an automatic flash-photographing arrangement in which the exposure time is automatically decided by an exposure-time control circuit when brightness of the object is high, the flash-photography being automatically carried out at a pre-determined shutter speed when brightness of the object is low.

b. Description of the prior art

When brightness of an object is high and it is possible to photograph it at a shutter speed higher than, for example, 1/30 sec., technical problems in photographing usually do not occur. When, however, brightness of the object is low and a favourable photograph cannot be obtained unless the shutter speed is lower than 1/30 sec., a problem of camera-shake is liable to exist. To solve this problem, the object is generally photographed a using flash-photography.

Using a modern camera of such type that the exposure time is automatically decided by an electronic control means, the necessity of flash-photography is either indicated by an warning lamp at the final stage of the shutter releasing operation or has to be judged based on the experience of the photographer. Shutter mechanisms are usually changed over from the state for photographing by natural light to the state in which flash-photography is possible by operating a lever, ring, etc. or by mounting a flash bulb to the camera body. Because of the above, known flash-photographing arrangement have disadvantages in that the release operating mechanism of the shutter becomes complicated and it is possible to miss the important shutter change while photographing. Additionally, in certain types of flash-photographing arrangements wherein the flash bulb is mounted to the camera body, the shutter speed is kept fixed at a particular value, for example at 1/30 sec., when said bulb is left mounted to the camera body after use and, consequently, photographing by natural light cannot be carried out.

SUMMARY OF THE INVENTION

It is, therefore, a primary object of the present invention to provide an automatic flash-photographing arrangement wherein flash EE-photograph can be automatically carried out when brightness of the object is higher than a preset level and wherein flash-photography also is carried out automatically when the brightness of the object is lower than said level without requiring any change-over operation.

Another object of the present invention is to provide an automatic flash-photographing arrangement having simple overall construction and suitable for small-sized cameras.

These and other objects of the present invention will become apparent during the course of the following detailed description and appended claims.

BRIEF DESCRIPTION OF THE DRAWING

The accompanying drawing is a circuit diagram illustrating an embodiment of the automatic flash-photographing arrangement according to the present invention.

DESCRIPTION OF THE PREFERRED EMBODIMENT

In the accompanying drawing, reference symbol $S_1$, represents an photoelectric element capable of receiving reflected light from the object to be photographed. Reference symbol $T_1$ represents a transistor for amplifying a photoelectric current generated by said photoelectric element $S_1$. Reference symbol $D_1$ represents a diode for compensating for temperature of the transistor $T_1$ and compensating for the voltage across the base and emitter of said transistor $T_1$. Reference symbol $C_1$ represents a capacitor for a first delay circuit, i.e., for exposure time control. Reference symbol $SW_1$ represents a starting switch to be opened in combination with opening movement of the shutter blades. Reference symbol $SW_2$ represents a switch to be changed over from a contact $a$ to a contact $b$ in association with a shutter releasing operation. Reference symbol $R_1$ represents a resistor for determining the range of proper exposure. Reference symbol $T_2$ represents a transistor made conductive through a resistor $R_2$ when a programmable unijunction transistor PUT switches ON. Reference symbol $R_3$ represents a resistor for biasing, and reference symbol DFA represents a differential amplifier. Reference symbol $D_2$ represents a diode for compensation of the voltage $V_{BE}$ across the base and emitter of the transistor constituting the differential amplifier DFA. Reference symbol $L_1$ represents a lamp for indicating that it is possible to expose by natural light only. Reference symbol Mg represents an electro-magnet for controlling the closing time of the shutter and which is energized only when the shutter is in an opened state. Reference symbol $E_1$ represents a power source, and reference symbol $SW_3$ represents a power switch. Reference symbol $SW_4$ represents a switch which is closed at the time when the shutter begins to open and which is opened when the shutter closes in combined operation with the starting switch $SW_1$. Reference symbol $R_4$ is a resistor capable of limiting the maximum exposure time of the shutter. Reference symbol $C_2$ represents a capacitor for a second delay circuit. Reference symbol $T_3$ represents a transistor which is made conductive in order to discharge the charge of the capacitor $C_2$ when the electro-magnet Mg is de-energized. Reference symbols $R_5$ and $R_6$ respectively represent a variable resistor and a resistor for introducing exposure factors such as a guide number. Reference symbol $R_7$ represents a resistor connected to the cathode of the transistor PUT. Reference symbol SCR represents an N-gate silicon thyristor while, reference symbols $N_1$ and $N_2$ respectively represent coils, and reference symbol $X_P$ represents an illuminating discharge tube. Reference symbol MC represents a main capacitor for electric discharge. Reference symbol Con V represents a DC-DC converter, and reference symbol $E_2$ represents a power source.

Now, operation of the automatic flash-photographing arrangement will be described.

According to the present invention, flash illuminating means do not operate when brightness of the object is higher than a predetermined value and the shutter is opened and closed by an exposure time which is shorter than, for example, 1/30 sec. That is, when the brightness of the object is higher than the pre-determined value the, electric potential of an input terminal $P_1$ of the differential amplifier DFA is lower than the electric potential of the other input terminal $P_2$ when the power switch $SW_3$ is initially closed as a result of the shutter releasing operation and, consequently, the indicating lamp $L_1$ comes ON. By the illumination of said lamp $L_1$, the photographer is informed that photograph by natural light is to be carried out. Thus, at the next stage of said shutter releasing operation, the switch $SW_2$ is changed over to the contact, and the shutter is opened. When the starting switch $SW_1$ is opened in combined operation with opening movement of the shutter, and the switch $SW_4$ is closed at the same time, the capacitor $C_1$ constituting the first delay circuit is charged by current of constant amperage which flows with a value corresponding to brightness of the object, across the emitter and collector of the transistor $T_1$. When, because of the above-mentioned charging, potential of the input terminal $P_1$ of the differential amplifier DFA becomes higher than potential $V_k$ of the other input terminal $P_2$ which is biased by the variable resistor $R_3$, the differential amplifier DFA is actuated, and the electro-magnet Mg which holds the shutter in opened state is de-energized. As a result, the shutter is closed and one exposure operation is completed.

In the above operation, the second delay circuit consisting of the resistor $R_4$ and capacitor $C_2$ is also energized at the same time as the switch $SW_4$ closes. However, the charge accumulated in said capacitor $C_2$ is discharged by the transistor $T_3$ which becomes conductive at the same time as the electro-magnet Mg is de-energized. The time required until the voltage across terminals of the capacitor $C_2$ reaches the operating voltage of the transistor PUT, which is regulated by potential of the contact point $P_3$, is selected by means of the resistor $R_4$. With this time being set to 1/30 sec. (which corresponds to the shortest exposure time which might cause camera shake), the voltage at the input terminal A imposed by the charge on the capacitor $C_2$ does not become equal to the operating voltage of the programmable unijunction transistor PUT when brightness of the object is high and the exposure time is shorter than 1/30 sec. This means that the flash illuminating circuit is always kept in the inactive state when photographing by natural light is to be carried out.

When the brightness of the object is lower than the pre-determined value and the exposure time becomes longer than 1/30 sec., flash-photography is automatically carried out as follows. In case where the exposure time, which is to be automatically controlled by the exposure time control circuit, is 1 sec. for example, the electromagnet Mg is de-energized, by means of shutter releasing operation, at 1 sec. after shutter opening. However, the voltage across the terminals of the capacitor $C_2$ becomes higher than the gate voltage (i.e., the operating voltage) of the transistor PUT 1/30 sec. after shutter opening. Therefore, transistor PUT becomes conductive at 1/30 sec. after shutter opening. In this case, the indicating lamp $L_1$ does not light, and the photographer understands that flash-photography will be carried out. When the transistor PUT becomes conductive, the voltage across the terminals of the resistor $R_7$ is imposed on the gate of the thyristor SCR and said thyristor SCR is turned ON. When the thyristor SCR is turned ON, a voltage is generated at the secondary coil $N_2$ by means of the voltage generated in the coil $N_1$. Accordingly, discharge tube $X_P$ is illuminated through the DC-DC converter Con V and main capacitor MC.

Simultaneously the voltage across the terminals of resistor $R_7$ is fed back to the transistor $T_2$ through the resistor $R_2$. Therefore, the transistor $T_2$ becomes conductive and current flows between the emitter and collector of this transistor $T_2$. By said current, the capacitor $C_1$ in the first delay circuit is charged. Consequently, before the exposure time to the automatically decided by the exposure time control circuit passes, i.e., at the time of 1/30 sec. after shutter opening, the potential of the input terminal $P_1$ of the differential amplifier DFA becomes higher than the preset potential $V_k$ of the other input terminal $P_2$. Thus, the differential amplifier DFA is operated, the electro-magnet Mg is de-energized, and the shutter is closed. However, inasmuch the shutter closes with a slight mechanical delay, light emitted by the discharge tube $X_P$ reaches the object, is reflected by it and reaches the film surface.

In the above-mentioned embodiment, the transistor $T_3$ is used to let the capacitor $C_2$ discharge. It is, however, also possible to let the capacitor $C_2$ discharge by using a mechanical switch or a reed switch which is closed by de-energization of the electro-magnet Mg.

As it is evident from the above explanation, when the delay time to be determined by the second delay circuit is selected, for example as 10 sec., by adjusting the resistance value of the resistor $R_4$, the maximum exposure time of the shutter is limited to 10 sec. regardless of the automatic exposure time control circuit.

I claim:

1. An automatic flash-photographing arrangement comprising a photoelectric current amplifying circuit, a first capacitor connectable to said photoelectric current amplifying circuit, a differential amplifier connected to said photoelectric current amplifying circuit, an electro-magnet connected to said differential amplifier and de-energized when said first capacitor is connected to said photoelectric current amplifying circuit and the voltage across the terminals of said capacitor reaches a pre-determined value, a switch member connected to said electro-magnet and closed when said electro-magnet is de-energized, a delay circuit connected to said switch member and comprising a second capacitor, a first switching element connected to said delay circuit, a second switching element connected to said first switching element, a flash illuminating circuit connected to said second switching element and operated when the voltage across the terminals of said second capacitor reaches a pre-determined value, and means including a transistor connected to said first switching element for feeding back an ON-condition of said first switching element to said first capacitor, said automatic flash-photographing arrangement causing flash-photography to be automatically carried out when the exposure time decided by said first capacitor becomes longer than the time predetermined by said delay circuit.

2. An automatic flash-photographing arrangement according to claim 1, in which said switch member is a transistor.

3. An automatic flash-photographing arrangement according to claim 1, in which said delay circuit comprises a settable variable resistor.

4. An automatic flash-photographing arrangement according to claim 1, in which said first switching element is a programmable unijunction transistor.

5. An automatic flash-photographing arrangement according to claim 1, in which said second switching element is an N-gate silicon thyristor.

* * * * *